July 23, 1946.  M. CASERTA  2,404,690
SHAFT SEAL
Filed April 17, 1944
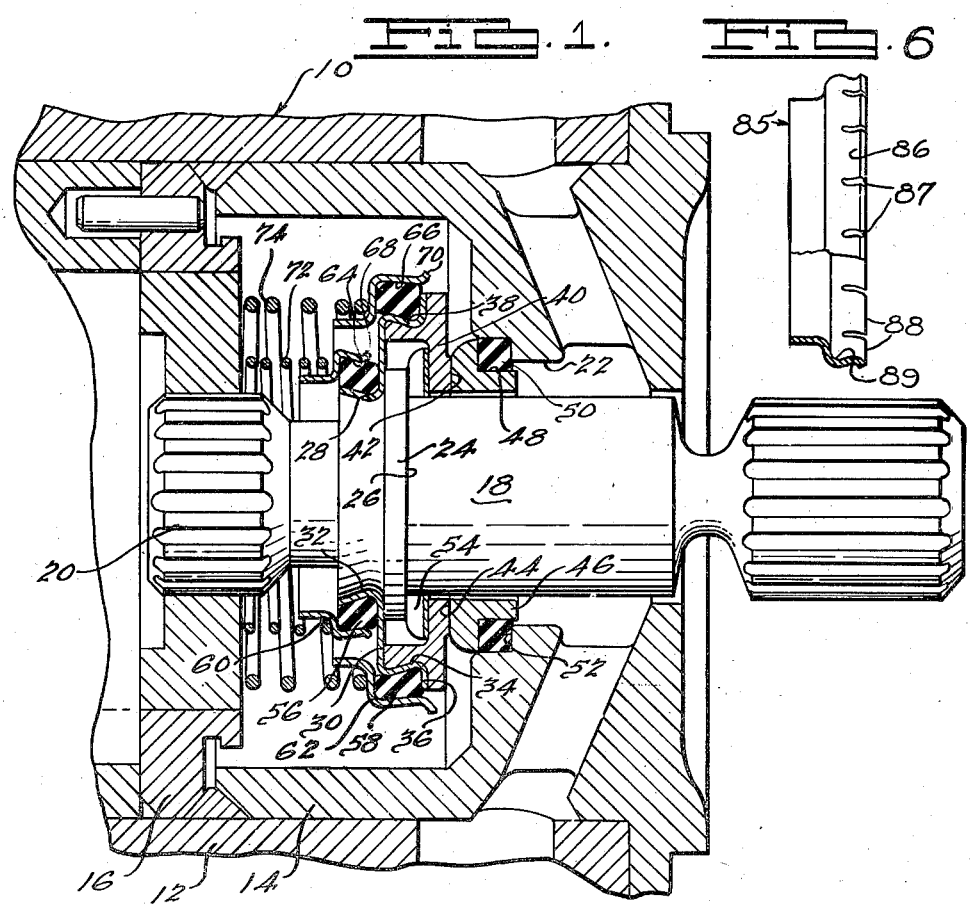
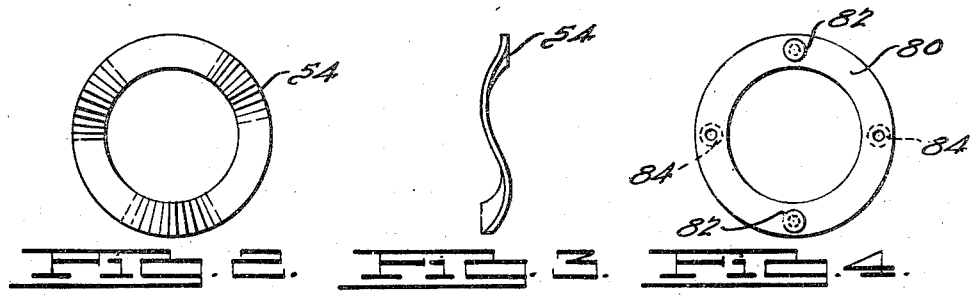
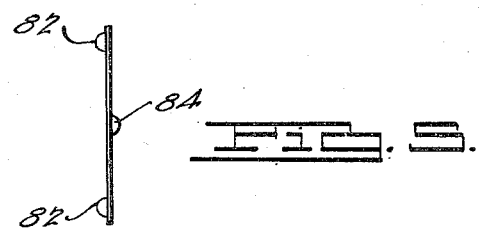
INVENTOR.
Michele Caserta.
BY
Charles W Hills
ATTORNEYS.

Patented July 23, 1946

2,404,690

UNITED STATES PATENT OFFICE 2,404,690

SHAFT SEAL

Michele Caserta, Detroit, Mich., assignor to Thompson Products, Inc., a corporation of Ohio Application April 17, 1944, Serial No. 531,437

13 Claims. (Cl. 286—11)

The present invention relates to improvements in fluid flow control devices and particularly relates to improvements in shaft seals for fuel pumps.

The primary object of the present invention is to provide improvements in devices of the type mentioned which will function properly over a wide temperature range, and particularly at low temperatures, for example, 65° below zero.

A further object of the invention is to provide improvements in a shaft seal for use on a fuel pump, such as a gasoline pump, which will not leak at low temperatures.

Other objects of the invention will become apparent from the following specification, the drawing relating thereto, and from the claims hereinafter set forth.

In the drawing, in which like numerals are used to designate like parts in the several views throughout:

Figure 1 is a fragmentary cross-sectional view, with parts in elevation, of a portion of a fuel pump having a seal assembly associated therewith and embodying the present invention;

Figure 2 is a front elevational view of the form of wobble washer employed with the structure of Figure 1;

Figure 3 is a side elevational view of the structure of Figure 2;

Figure 4 is a view similar to Figure 2 showing a modification thereof;

Figure 5 is a side elevational view of the structure shown in Figure 4; and

Figure 6 is an elevational view, partly broken away and in section, of a modified form of retainer cup for use in the seal assembly of my invention.

In particular, the present invention is concerned with improvements in the drive shaft seal disclosed in the co-pending application of Michele Caserta Serial No. 397,763, now Patent No. 2,353,-545 dated July 11, 1944, but it will be apparent to those skilled in the art that the present invention is applicable to other devices as well.

Referring to the drawing, a portion of a fuel pump is generally indicated at 10 and includes a housing 12 having a gland 14 disposed in one end thereof. For the purpose of the present invention, the gland 14 may be considered as a part of the pump housing. A pump rotor 16 is rotatably mounted within the housing and is driven by a drive shaft 18 through a spline connection 20. Such shaft 18 projects through an axial opening 22 formed in the gland 14 and the splined end thereof projects beyond the gland and is adapted to be drivingly connected to a suitable drive means.

With the exception of certain details of construction of the drive shaft 18, the structure so far described is the same as that disclosed in the above-mentioned Caserta application and reference may be had thereto for a more detailed understanding of the construction and operation of the fuel pump with which the seal assembly of the present invention is employed.

The shaft 18, in passing through the pump wall, or the gland wall, must be allowed to wobble because of possible eccentricities in both the male and female splines at each end of the shaft. At the same time, the gasoline, which is under a pressure on the left hand side of the gland 14, must not be allowed to leak out.

According to the present invention, the shaft 18 is formed with an integral annular shoulder 24 having a substantially flat radial face 26 formed on one side thereof and having a tapered shoulder portion 28 formed adjacent the other face thereof. Such shoulder is slightly larger in diameter than the splined portions of the shaft.

A flexible diaphragm 30, formed of a flexible material such as synthetic rubber or an impregnated fabric, has an inner annular portion 32 which embraces the tapered shoulder 28 of the shaft 18. It has an outer annular portion 34, which terminates in an outwardly directed flange 36 which is adapted to embrace an overhanging, annular shoulder 38 of a bronze sealing ring 40. Such ring 40 has a highly finished, preferably lapped, sealing face 42 which is adapted to abut against a lapped sealing seat 44 formed on the facing side of a steel ring 46. The steel ring 46 is formed with an annular shoulder 48 which has a resilient gasket 50 disposed therein, such gasket 50 preferably being formed of synthetic rubber. The gasket 50 is adapted to be received within an annular seat or shoulder 52 formed in the gland 14 adjacent one corner of the axial opening therethrough.

The ring 46 is adapted to be stationary while the sealing ring 40 rotates with shaft 18. The bearing between surfaces 42 and 44 provides the seal which prevents the escape of fluid from the pump. By reason of the fact that said sealing faces 42 and 44 are lapped, a completely fluid-tight seal can be maintained between said faces if the proper pressure therebetween is constantly maintained. This is accomplished by the construction about to be described.

A wobble washer or spring washer 54 surrounds shaft 18 and is disposed between shoulder 24 and the adjacent face of sealing ring 40 so that it abuts against the shoulder face 26 and the adjacent face of the ring 40. The form of the washer employed with the embodiment of Figure 1 is shown in Figures 2 and 3. It will be evident that the flexibility of this washer will permit a wobble of the shaft 18 without changing the relationship of the ring 40 with respect to the ring 46.

One important feature of the present invention is the manner in which the diaphragm 30 is secured to the shaft 18 and to the sealing ring 40. The annular portion 32 of the diaphragm 30 is held against the tapered shoulder 28 by means of a rubber ring, or gasket 56. The annular portion 34 of the diaphragm 30 is held in place on shoulder 38 by means of a rubber ring, or gasket 58. The rubber rings 58 and 56 are held in place by means of retainer cups 60 and 62, each of which is formed with a slight back draft, as indicated at 64 and 66, respectively, terminating in out-turned ends, indicated at 68 and 70, respectively. The back draft on the retainer cups serves to help retain the cups on their respective rubber rings, or gaskets, and the slight radius of their leading ends serves to facilitate assembly.

Coil springs 72 and 74 are disposed to have one of the ends thereof abut against the rotor wall 16 and the other ends thereof abut against retainer cups 60 and 62, respectively. The springs 72 and 74 act to resiliently urge the entire sealing assembly toward the right, viewing Figure 1, so that sealing parts and the shaft are resiliently urged toward the right, with the gasket 50 urged into its seat 52.

The seal between diaphragm portion 32 and shoulder 28, and that portion of the diaphragm 30 which engages the radial face of shoulder 24, are pressed securely together by the spring 72 and through the retainer cup 60. A seal is thereby produced between the diaphragm and the shaft. It will be understood that if the rubber gasket 56 shrinks, as may happen after it has been immersed in fuel and then dried again, it presses the diaphragm harder against the tapered shoulder 28. If the gasket 56 swells, as may happen after it has been immersed for a time in fuel, it will be seen that it is contained within the portion 64 of the retainer cup and must swell inwardly, thereby again clamping the diaphragm tighter around the shaft and improving the seal between the diaphragm and the shaft. Also, if the diaphragm portion 32 shrinks, it tends to slide down along the tapered shoulder 28 and against the adjacent radial face of shoulder 24, being urged in that direction by spring 72.

The action of the outer portion 34 of diaphragm 30 against the sealing ring 40 is similar to that just described in providing a seal between said diaphragm and the ring 40.

The diaphragm 30 thus functions to provide a fluid-tight seal between the shaft 18 and the rotary sealing ring 40, and also functions as the driving connection between said shaft and rotary sealing ring.

It will be seen that when the shaft 18 is pressed toward the right, viewing Figure 1, by the action of spring 72 and the fuel pressure, it will press the bronze sealing ring 40 against the steel ring 46, so that the faces 42 and 44 are in sealing engagement or sealing bearing relationship with each other. Because of the presence of the wavy washer 54, it is possible for the shaft to wobble, while the sealing face 42 rotates against the face 44 and always remains in the plane of the face 44 without wobbling.

The seal seat gasket 50 may allow a wobbling action of seat 46 so long as the gasket 50 is flexible as, for example, at the higher temperatures, such as ordinary room temperatures. Such flexibility remains over a considerable range of temperatures, but at very low temperatures, where the structure of the present invention must operate satisfactorily, as well as at the higher temperatures, such gasket becomes stiff and rigid and will not serve any other function than to provide a seal between ring 46 and the wall of gland 14. It should be noted that when the gasket 50 is assembled it is flexible and is pressed between the mating parts while it is flexible, thereby adapting itself to any roughness of the surfaces and providing a seal between such surfaces without introducing strains which might warp the face of ring 46, which would be the case if the parts were press fitted.

When operating at low temperatures, such, for example, as 65° below zero, the rubber gasket 50 becomes rigid in the form which it has assumed while elastic and therefore continues to provide a seal between ring 46 and gland 14.

While, of course, the diaphragm 30 is subjected to the same temperatures as gasket 50, it is of a much thinner section relative to its area and may tend to stiffen at lower temperatures; but, because of its relatively thin section for its large area, it will still be flexible enough to permit the wobbling action above referred to.

Due to the action of the spring 74, the rotary seal 40 is always pressed against the stationary sealing ring 46 so that the faces 42 and 44 are always pressed against each other with the required amount of pressure. There is thus no possibility of dirt getting between such surfaces, as might happen when the shaft 18 is pushed inwardly of the housing, and a fluid-tight seal can be maintained under all operating conditions. The diaphragm 30 permits a limited relative movement between the seal 40 and the shaft 18 so that the seal 40 always remains against the ring 46. Also, since in the structure of the present invention the seal 40 and the ring 46 are both cushioned in rubber, the possibility of distorting the lapped surfaces 42 and 46 is thereby avoided.

It will thus be apparent that my construction provides a fluid-tight seal for the shaft that permits limited axial and wobbling movements of the shaft and that remains unimpaired in its effectiveness even at extremely low temperatures.

In Figures 4 and 5, a modified form of the wobble washer is illustrated in which the major portion of the washer may be formed of a flat ring 80 having diametrically opposed tabs 82 struck out on one side thereof and diametrically opposed tabs 84 struck out on the other side and spaced 90° from the tabs 82. Thus, the tabs 82 would engage the face 26 of shoulder 24, for example, and tabs 84 would engage the adjacent face of ring 40. The shaft 18 would thus be permitted to wobble with respect to the sealing ring 40, the same as that described above, and the seal would be effective to prevent leakage.

A modified form of construction for the retainer cups 60 and 62 is illustrated in Figure 6. As there shown, the retainer cup 85 is formed with a gasket engaging flange 86 that is provided with narrow inwardly extending slots 87. By providing a slit rather than a solid flange, it is possible to make the retainer cup slightly smaller than the gasket which the flange is to encompass. The prongs 88, formed by the slots 87, provide sufficient elasticity to permit the flange 86 to be slipped over the gasket, such as the gasket 58, and then to press the gasket into the back draft groove portion 89 of the flange. The prongs 88 allow for considerable shrinkage in the gasket and still exert a radial compression upon said gasket. The width of the slots 87 is so small that there is no chance of the material of the gasket oozing out between the prongs.

Either, or both, of the retainer cups 60 or 62 may be constructed in the manner shown for the retainer cup 85 for cooperation with the gaskets 56 and 58, respectively.

What I claim is:

1. In a fluid flow control device, a housing, a rotatable shaft extending into said housing, said shaft having a shoulder formed with an annular portion, sealing means associated with said shaft and housing, said sealing means including a sealing ring disposed on said shaft having a planar sealing face and having an annular portion, a flexible sealing diaphragm having an inner annular portion and an outer annular portion adapted to embrace said shaft shoulder annular portion and said sealing ring annular portion, respectively, resilient bands embracing said inner and outer annular diaphragm portions, a pair of independent retainer cups embracing said bands, respectively, independent resilient means engaging said cups, respectively, and urging said bands and annular diaphragm portions into engagement with the shaft and ring, respectively, and means providing a seal between said sealing ring and said housing.

2. In a fluid flow control device, a housing, a rotatable shaft extending into said housing, said shaft having a shoulder formed with an annular portion, sealing means associated with said shaft and housing, said sealing means including a sealing ring disposed on said shaft having a planar sealing face and having an annular portion, a flexible sealing diaphragm having an inner annular portion and an outer annular portion adapted to embrace said first and second-named annular portions, respectively, resilient bands embracing said inner and outer annular diaphragm portions, a pair of independent retainer cups embracing said bands, respectively, said cups being formed with a slight back draft on those portions which engage said bands and having out-turned leading edges, independent resilient means engaging said cups, respectively, and urging said bands and annular diaphragm portions into engagement with the shaft and ring, respectively, and means providing a seal between said sealing ring and said housing.

3. In a fluid flow control device, a housing, a rotatable shaft extending into said housing, said shaft having a shoulder formed with a tapered, annular portion, sealing means associated with said shaft and housing, said sealing means including a sealing ring disposed on said shaft having a planar sealing face and having a tapered, annular portion, a flexible sealing diaphragm having an inner annular portion and an outer annular portion adapted to embrace said shaft shoulder annular portion and said sealing ring tapered annular portion, respectively, resilient bands embracing said inner and outer annular diaphragm portions, a pair of independent retainer cups embracing said bands, respectively, said cups being formed with a slight back draft on those portions which engage said bands, independent coil springs engaging said cups, respectively, and urging said bands and annular portions into engagement with the shaft and ring, respectively, and means providing a seal between said sealing ring and said housing.

4. In a fluid flow control device, a housing, a rotatable shaft extending into said housing, said shaft having a shoulder formed with an annular portion, a sealing assembly including a sealing ring disposed on said shaft and having an annular portion, a flexible diaphragm having an inner annular portion and an outer annular portion adapted to embrace said first- and second-named annular portions, respectively, resilient clamping elements embracing said inner and outer annular diaphragm portions, a wobble washer around said shaft and disposed between said shoulder and sealing ring in abutting relation thereto, a ring member around said shaft having a face seat adapted to bear against a sealing face on said sealing ring, and a resilient gasket embracing said ring member and adapted to be received in a seat in said housing, and resilient means urging said assembly toward said seat.

5. In a fluid flow control device, a housing including a seal seat, a shaft extending into said housing, means providing a shoulder on said shaft, a diaphragm, a rotary seal member provided with a shoulder, a resilient gasket pressing said diaphragm against said first-named shoulder, and a resilient gasket pressing said diaphragm against said second-named shoulder.

6. In a fluid flow control device, a housing including a gland having an annular seat, a stationary seal member having a planar sealing face, a resilient gasket seated in said seat and supporting said seal member from said gland, a shaft extending into said housing, means providing a shoulder on said shaft, a diaphragm, a rotary seal member having a planar sealing face in bearing relation to said first planar sealing face and provided with a shoulder, a resilient gasket pressing said diaphragm against said first-named shoulder, and a resilient gasket pressing said diaphragm against said second-named shoulder.

7. In a fluid flow control device, a housing including a seal seat, a shaft extending into said housing, means providing a shoulder on said shaft, a diaphragm, a rotary seal member provided with a shoulder, resilient means pressing said diaphragm radially against said first-named shoulder, resilient means pressing axially against said first-named shoulder, resilient means pressing said diaphragm radially against said second-named shoulder, and resilient means pressing axially against said second-named shoulder.

8. In a fluid flow control device, a housing including a seal seat, a shaft extending into said housing, means providing a shoulder on said shaft, a diaphragm, a rotary seal member provided with a shoulder, a resilient gasket pressing said diaphragm against said first-named shoulder, a resilient gasket pressing said diaphragm against said second-named shoulder, and a wavy washer disposed between said shaft shoulder and said rotary seal member.

9. In a fluid flow control device, a housing including a seal seat, a shaft extending into said housing, means providing a shoulder on said shaft, a diaphragm, a rotary seal member provided with a shoulder, a resilient gasket pressing said diaphragm against said first-named shoulder, a resilient gasket pressing said diaphragm against said second-named shoulder, and a washer having projections formed on opposite faces thereof which are angularly offset to allow a wobble action between said shaft and seal member.

10. In combination, a shaft having a shoulder, a rotary sealing ring, a flexible diaphragm and resilient gaskets retaining portions of said diaphragm against said shoulder and against said ring to provide a fluid-tight driving connection therebetween.

11. In combination, a shaft having a shoulder thereon, a sealing ring stationarily associated with said shaft, a second sealing ring rotatable with said shaft and in sealing contact with said first sealing ring, a wobble washer between said shaft shoulder and said rotatable sealing ring, a diaphragm engaging said second sealing ring and said shaft and means resiliently urging said diaphragm into closer engagement to insure a fluid-tight seal with said shaft and to cause said second sealing ring to be driven with said shaft through said diaphragm while permitting slight axial and wobbling movement between said shaft and said rotatable sealing ring.

12. In combination, a shaft, a rotary seal member, a flexible diaphragm and resilient gaskets securing portions of said diaphragm to said shaft and to said rotary seal member to provide a fluid-tight driving connection therebetween and retainer cups overlying said resilient gaskets and resiliently urged thereagainst to confine said gaskets, whereby any increase in volume of said resilient bands results in greater pressure of contact between said diaphragm and said shaft and said diaphragm and said rotary seal member respectively.

13. In a fluid flow control device, a housing including an annular seat, a resilient gasket positioned in said seat, a stationary seal member positioned against said gasket, a shaft extending into said housing and through said stationary seal member with clearance therebetween, said shaft having a shoulder, a rotary seal member in bearing relation to said stationary seal member, a diaphragm between and in direct contact with said shoulder and said rotary seal member and resilient means urging said diaphragm into fluid-tight sealing relationship with said shoulder and said rotary seal member and establishing said diaphragm as the driving connection between said shaft and said rotary member.

MICHELE CASERTA.